Jan. 10, 1928.  1,656,109
S. E. FEGLEY
APPARATUS FOR FORMING FUEL CHARGES
Filed April 15, 1927
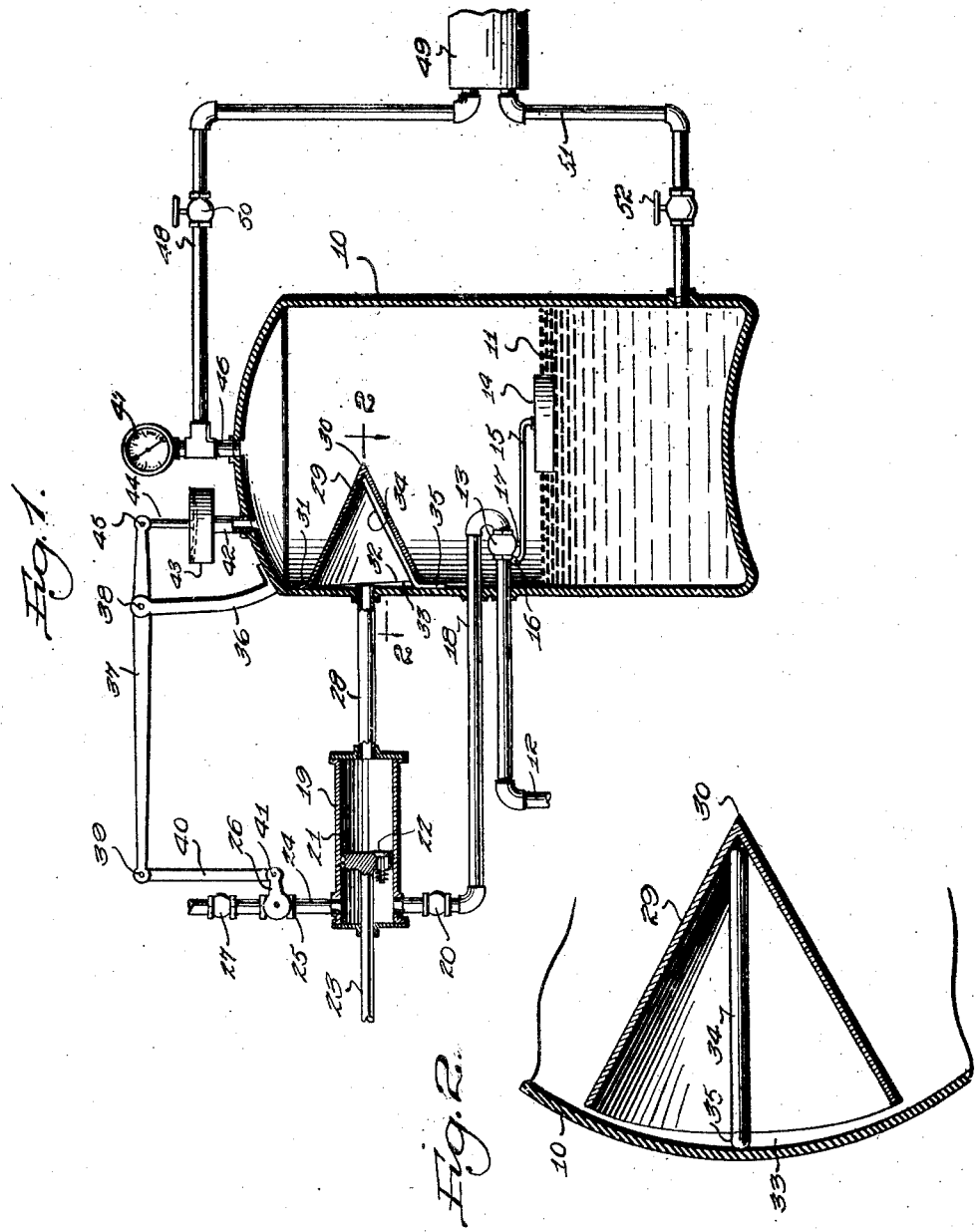
Inventor
SAMUEL E. FEGLEY
By
Attorney Patented Jan. 10, 1928.

1,656,109

UNITED STATES PATENT OFFICE.

SAMUEL E. FEGLEY, OF LANCASTER, PENNSYLVANIA.

APPARATUS FOR FORMING FUEL CHARGES.

Application filed April 15, 1927. Serial No. 184,168.

This invention relates to a method and apparatus for forming fuel charges.

It is the present practice in forming fuel charges for oil burners and the like to convey the liquid fuel to the burner, mix the fuel with relatively pure air to support combustion and then to burn the combustible charge thus formed. The present types of burners have been found to be relatively inefficient, it being extremely difficult to obtain complete combustion of the fuel.

It is an important object of the present invention to provide a method of forming fuel charges particularly for use with oil burners, whereby more perfect combustion is obtained with a consequent reduction in carbon formations and a corresponding increase in heat units derived from a given quantity of fuel.

A further object is to provide a method wherein the air supplied to the burner to support combustion carries a relatively small quantity of combustible fuel preferably in the form of relatively small globules whereby combustion is greatly assisted and rendered more perfect.

A further object is to provide a method of the character referred to wherein the air to be conveyed to the burner to support combustion is first intimately mixed with the fuel to take up fuel in the form of small globules and then to separate the air from the greater portion of the fuel whereby the latter may be fed to the burner in the usual manner and the air may be fed to the burner charged with a relatively small proportion of the fuel.

A further object is to provide a novel form of apparatus whereby the air to be conveyed to the burner to support combustion may be charged with a small quantity of fuel for the purposes set forth above.

A further object is to provide means for intimately mixing the fuel with the air subsequently to be used to support combustion and then to separate the greater portion of the liquid fuel from the air whereby it may be conveyed to the burner, the air then being also conveyed to the burner charged with a relatively small proportion of the fuel and mixed with the liquid fuel to support combustion.

A further object is to provide means associated with an apparatus of the character referred to for governing the amount of fuel and air supplied.

A further object is to provide a fuel tank adapted to contain liquid fuel at a constant level, and to provide means for supplying intimately mixed fuel and air to the tank above the level of the oil therein, the tank being provided with means for separating the air from the greater portion of the fuel whereby the latter will drain into the bottom of the tank to be supplied to the burner, and whereby the air, charged with a relatively small proportion of fuel, may be conveyed to the burner.

A further object is to provide an apparatus of the character just referred to having means for governing the supply of fuel according to the level of the fuel in the tank, and to provide means for mixing the air and fuel and injecting it into the tank to be partially separated in the manner above referred to.

A further object is to provide an apparatus of the character just mentioned wherein a pressure is maintained within the tank to feed both the fuel and the air charged with the fuel to the burner whereby it may be burned, means being provided for varying the supply of air to the tank according to the pressure therein.

Other objects and advantages of the invention will become apparent during the course of the following description.

In the drawings I have shown one embodiment of the invention. In this showing,

Figure 1 is a central vertical sectional view of the apparatus, parts being shown in elevation, and, Figure 2 is a detail section on line 2—2 of Figure 1.

Referring to the drawings, the numeral 10 designates a suitable tank adapted to contain a body of liquid fuel 11. A pipe 12 is connected at its outer end to a source of liquid fuel supply, such as a fuel oil tank, the inner end of this pipe projecting into the tank 10 and being provided with a regulating valve 13 adapted to control the flow of oil through the pipe 12. A float 14 is adapted to rest upon the body of fuel 11 and is secured to an arm 15 pivotally connected to the valve 13, as at 16. This valve has a stem 17 adapted to contact with the arm 15 whereby the flow of oil through the valve 13 may be governed according to the position of the float 14, the latter being dependent upon the level of the oil 11.

The valve 13 is connected to an outlet pipe 18 which extends from the tank 10, as shown in Figure 1, and at its outer end, the pipe 18 communicates with the interior of a pump or compressor cylinder 19. A check valve 20 is preferably arranged in the pipe 18 to prevent the flow of fuel outwardly from the cylinder 19. A piston 21 is mounted to reciprocate in the cylinder 19 and is provided with a check valve 22, as shown. A piston rod 23 is connected to the piston 21 and is adapted to be operated from any suitable source of power.

An air pipe 24 also communicates at its inner end with the interior of the cylinder 19, and a valve 25 is adapted to control the passage of air through the pipe 24. An arm 26 is connected to the stem of the valve 25 to operate it in a manner to be described. The pipe 24 also is provided with a check valve 27 to prevent the flow of air outwardly from the cylinder 19, and the outer end of the pipe 24 is open to the atmosphere.

The piston 21 is adapted to pump air and fuel from the cylinder 19 to the interior of the tank 10 through a pipe 28, the inner end of which is arranged above the level of the oil within the tank. A baffle 29 is arranged within the tank to intercept the mixture pumped thereinto and this baffle is preferably in the form of a cone having its apex 30 arranged in alinement with the pipe 28. The arrangement described is the preferred one, but it will be apparent that it is not essential to the operation of the apparatus. The upper portion of the base of the cone may be provided with a flange 31 welded or otherwise secured to the wall of the tank 10. The base of the cone is preferably angularly arranged with respect to the adjacent portion of the wall of the tank, as indicated at 32, thus providing a space 33 between the cone and the wall of the tank, as indicated in Figure 2. A wire or rod 34 is secured within the lower portion of the cone and has its lower extremity 35 bent to fit against the wall of the tank. The wire or rod 34 also serves as supporting means for the lower extremity of the cone whereby it will be arranged to provide the space 33, and the wire may be welded or otherwise secured both to the cone and to the tank, as will be apparent.

A supporting bracket 36 is secured to the top of the tank and pivotally supports a lever 37 as at 38. The outer extremity of the lever is pivotally connected as at 39 to the upper end of a link 40, the lower end of this link being pivotally connected to the outer end of the arm 26 as at 41. A pipe 42 communicates with the upper end of the tank to convey pressure from the tank to a pressure responsive member 43 adapted to actuate a rod 44. The pressure responsive member may be of any desired form. The upper end of the rod 44 is pivotally connected to the inner end of the lever 37, as at 45, and it will be apparent that the pressure responsive member is adapted to actuate the lever 37 and valve arm 25 to vary the passage of air through the pipe 24 according to the pressure present in the tank 10.

A pipe 46 is connected at its lower end to the upper end of the tank 10, and a pressure gage 47 may be arranged on the upper end of the pipe 46. A branch pipe 48 is connected at one end to the pipe 46 and is adapted to deliver air and a relatively small quantity of fuel to a burner 49 of any desired type. A suitable controlling valve 50 may be arranged in the pipe 48. Liquid fuel is delivered to the burner from the lower portion of the tank 10 through a pipe 51 adapted to be controlled by a valve 52.

The operation of the apparatus is as follows:

Oil is supplied to the pipe 12 from a suitable storage tank, and the passage of oil through this pipe is regulated by the valve 13, the latter being controlled by the position of the float 14. Thus it will be apparent that the flow of oil to be delivered to the tank in the manner to be described will be governed by the quantity of fuel in the tank to maintain a constant level therein. From the valve 13 the fuel flows through the pipe 18, and movement of the piston 21 toward the inner end of the cylinder 19 is adapted to draw fuel into the latter. This same movement of the piston also draws air into the cylinder through the pipe 24, and the movement of the piston serves to agitate the air and oil, tending to mix them. Upon outward movement of the piston 21 the oil and air will flow past the valve 22 into the opposite end of the cylinder, and the passage of the oil and fuel past the valve 22 serves to maintain the mixture of fuel and air. The check valves 20 and 27 are adapted to prevent outward movement of the fuel and air from the cylinder, but it will be apparent that if a fuel supply tank is arranged above the cylinder 19, the fuel will be supplied thereto by gravity.

The mixed fuel and air will be pumped under pressure through the pipe 28 and will be impacted against the cone 29 which is adapted to act as a baffle and condenser. The greater portion of the oil striking the baffle 29 will flow downwardly and will drain from the bottom of the cone, the capillary attraction of the wire or rod 34 aiding this action. The air will flow into the tank through the space 33, and it has been found that a small proportion of fuel will remain suspended in the air in the form of small globules. The pumping of the mixture into the tank builds up a pressure therein, and this pressure is maintained during the operation of the apparatus. The pressure will be indicated by the gage 47, and as the pressure increases above the desired limit the pressure responsive member 43 will serve to operate the valve 25 in the manner previously stated to reduce the proportionate amount of air supplied to the cylinder 19. The pressure maintained in the tank 10 serves to force the liquid fuel from the bottom of the tank 10 to the burner 49 through the pipe 51, the supply of oil to the burner being regulated by the valve 52. Air for supporting combustion will be supplied to the burner through pipe 48 and may be regulated by the valve 50. Thus it will be apparent that a single source of pressure, that is, the pressure within the tank 10, is utilized for forcing both liquid fuel and air to the burner. With the apparatus described, a small proportion of the fuel will be supplied to the burner with the air passing through the pipe 48, and in practice it has been found that the presence of this relatively small proportion of fuel greatly adds to the action of the burner, rendering the latter more efficient and materially improving the combustion. The formation of carbon on the walls of the furnace or other apparatus in connection with which the burner is employed is materially reduced, and more heat units are derived from a given quantity of fuel.

From the foregoing it will be apparent that I provide a method of forming fuel charges which comprises in its broadest sense the use of a combustion supporting medium such as air for rendering a fuel oil or the like combustible, and in suspending or similarly carrying in the body of the air a relatively small percentage of fuel. More specifically, the present method comprises mixing air with a liquid fuel, separating the greater portion of the fuel from the air to leave a small proportion of fuel suspended in the air, and supplying the oil and the air to a burner where combustion is adapted to take place.

It is to be understood that the form of the apparatus herewith shown and described as well as the various steps of the method, are to be taken as preferred examples of the same and that various changes in the shape, size and arrangement of parts, and in the steps of the method, may be made without departing from the spirit of the invention or the scope of the subjoined claims.

I claim:

1. Apparatus of the character described comprising a tank, a compressor, means for supplying liquid fuel and air to said compressor, a pipe connecting said compressor to said tank whereby air and fuel may be pumped into the latter under pressure, said air and fuel being adapted to partially separate in said tank, means for varying the supply of fuel to said compressor according to the level of the fuel in said tank, means for varying the supply of air to said compressor according to the pressure in said tank, and a pair of pipes connected to said tank adjacent the top and bottom thereof respectively and adapted to be connected to a burner.

2. Apparatus of the character described comprising a tank, a compressor, means for supplying liquid fuel and air to said compressor, a pipe connecting said compressor to said tank whereby air and fuel may be pumped into the latter under pressure, the air and fuel being adapted to partially separate in said tank, a valve adapted to control the supply of fuel to said compressor, a float arranged in said tank and controlling said valve, means for varying the supply of air to said compressor according to the pressure in said tank, and a pair of pipes connected to said tank adjacent the top and bottom thereof respectively and adapted to be connected to a burner.

3. Apparatus of the character described comprising a tank, a compressor, a pipe adapted to supply liquid fuel to said compressor, a portion of said pipe extending into said tank, a pipe adapted to supply air to said compressor, means connecting said compressor to said tank whereby air and fuel may be pumped into the latter under pressure, the air and fuel being adapted to partially separate in said tank, a valve arranged in the portion of said fuel pipe extending into said tank, a float arranged in said tank and adapted to control said valve to vary the passage of fuel therethrough according to the level of the fuel in said tank, a valve arranged in said air pipe, pressure responsive means adapted to control said last named valve according to the pressure in said tank, and a pair of pipes connected to said tank adjacent the top and bottom thereof respectively and adapted to be connected to a burner.

4. Apparatus of the character described comprising a tank, a compressor, means for supplying liquid fuel and air to said compressor, a pipe connecting said compressor to said tank whereby air and fuel may be pumped into the latter under pressure, a baffle arranged in said tank in the path of fuel and air discharged thereinto from said compressor, means for varying the supply of air to said compressor according to the pressure in said tank, and a pair of pipes connected to said tank adjacent the top and bottom thereof respectively and adapted to be connected to a burner.

5. Apparatus of the character described comprising a tank, a compressor, means for supplying liquid fuel and air to said compressor, a pipe connecting said compressor to said tank whereby air and fuel may be pumped into the latter under pressure, a conical baffle arranged in said tank in the path of fuel and air discharged thereinto from said compressor, the base of said baffle being arranged adjacent and having portions spaced from the wall of said tank, a rod having one end portion contacting with the lower portion of said baffle and having its opposite end portion contacting with the wall of the tank, means for varying the supply of fuel to said compressor according to the level of the fuel in said tank, means for varying the supply of air to said compressor according to the pressure in said tank, and a pair of pipes connected to said tank adjacent the top and bottom thereof respectively and adapted to be connected to a burner.

In testimony whereof I affix my signature.

SAMUEL E. FEGLEY.